US006501705B1

United States Patent
Molini et al.

(10) Patent No.: US 6,501,705 B1
(45) Date of Patent: Dec. 31, 2002

(54) ACOUSTIC SURVEILLANCE SYSTEM WITH SIGNATURE AND BEARING DATA DISPLAY

(75) Inventors: John J. Molini, Strasberg; Warren C. Hollis, deceased, late of Reston, by Mildred H. Hollis, legal representative; Sung Hong, Fairfax, all of VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/599,234

(22) Filed: Jun. 22, 2000

(51) Int. Cl.[7] ............................................... H04B 1/06
(52) U.S. Cl. ...................... 367/135; 367/107
(58) Field of Search ................. 367/135, 127, 367/124, 118, 107

(56) References Cited

U.S. PATENT DOCUMENTS

| | | |
|---|---|---|
| 1,115,363 A | 10/1914 | Wood |
| 2,422,337 A | 6/1947 | Chilowsky ................... 177/386 |
| 3,792,421 A | 2/1974 | Frazier |
| 4,736,199 A | 4/1988 | Chadwick et al. ........... 340/728 |
| 4,868,792 A | 9/1989 | Grado ........................... 367/13 |
| 5,138,587 A | 8/1992 | Mason ......................... 367/136 |
| 5,175,710 A | * 12/1992 | Hutson ......................... 367/135 |
| 5,412,622 A | 5/1995 | Pauer et al. ................. 367/154 |
| 5,557,584 A | 9/1996 | Suchman ..................... 367/131 |

FOREIGN PATENT DOCUMENTS

WO   WO 99/18451   4/1999   ............. G01S/7/62

OTHER PUBLICATIONS

A copy of PCT International Search Report for International Application No. PCT/US01/20146 mailed on Mar. 15, 2002 (7 pages).

* cited by examiner

Primary Examiner—Daniel T. Pihulic
(74) Attorney, Agent, or Firm—Dicke, Billig & Czaja, P.A.

(57) ABSTRACT

An underwater acoustic sensor system for detecting and efficiently displaying data from small, shallow-draft targets at high speeds in shallow or very shallow water. Sonar buoys transmit electrical signals representing sound pressure waves, which are processed to ascertain bearing and signature information for a detected object. A single display having a bearing history area, a frequency history area, and a bearing/frequency area, provide a system operator with efficient correlation between bearing and frequency data.

26 Claims, 7 Drawing Sheets

ACOUSTIC SURVEILLANCE SYSTEM WITH SIGNATURE AND BEARING DATA DISPLAY

THE FIELD OF THE INVENTION

The present invention relates to a system for the detection of objects in a body of water, and more particularly, to the display of underwater acoustic sensor system data.

BACKGROUND OF THE INVENTION

Surveillance of bodies of water for military and commercial applications include the art of underwater sound detection. Underwater acoustic sensing devices, such as sonar buoys, are often deployed to aid in the surveillance operations including harbor defense, smuggling countermeasures, riverine observation, force and vessel protection. Passive sonar buoys sense sounds, such as those sounds produced by propellers and machinery. Active sonar buoys bounce a sonar signal off the surface of an object, such as a vessel. Detection of small, shallow-draft surface crafts at high speeds in shallow or very-shallow water is the most difficult surveillance problem.

Sonar buoys typically include a buoyant chamber containing one or more sensors, such as hydrophones, and a transmitter. Hydrophones convert underwater sound pressure waves to electrical signals. The acoustic surveillance system attempts to ascertain bearing and signature information from the pressure waves received. Bearing information includes azimuth, and possibly elevation, to the target relative to the sensor and is ascertained using hydrophone sensors with orthogonally-oriented axes. Signature information involves identifying characteristics, such as frequency, of detected sounds.

Sound signals are amplified and transmitted to a surveillance acoustic processor. The transmitted signal is a composite of the signals received by the various sensors. Signal transmission may be via radio frequency or cable. The complex underwater sound electrical signal is further processed by the acoustic processor to obtain sound source discrimination which is finally displayed for operator interpretation. Conventionally, sensor sound signal data was displayed in graph form versus time. Optionally, historical data was displayed along with the most recent sensor information to facilitate pattern recognition.

Acoustic surveillance system operators must quickly compare and correlate bearing and signature information to identify and locate objects in the water. This is particularly difficult in shallow or very shallow water, where objects are only detected close to the sensor, thus bearing and signature information change quickly. Multiple targets further complicate the operator's task.

Some conventional acoustic surveillance systems display only signature, i.e., frequency history, information, when bearing information is not available. FIG. 1 is a pictorial representation of such a conventional frequency history acoustic data display. Where bearing history information is available, frequency history and bearing history are conventionally displayed side-by-side as illustrated in FIG. 2. Time extends downward along the vertical axis of a conventional display. The most recent data is located at the top of the display. In this orientation, the time axis of the bearing history portion is aligned in parallel with the time axis of the frequency history portion. In this manner, the operator relates events on the frequency history with events occurring at the same time on the bearing history. Optionally, a conventional acoustic surveillance system display presents multiple copies of the frequency history for sensors in different directions.

The manner in which a conventional acoustic surveillance system displays frequency history and bearing history sensor data burdens the system operator with the task of relating the various frequency history traces to one or more of the various bearing history traces. If a target suddenly turns itself off, the operator sees both frequency trace lines and bearing trace lines stop, enabling the operator to relate the two traces. When a target performs an abrupt maneuver, typically an operator observes a dramatic shift in bearing along with a change in frequency of the associated signal, again enabling a relation of signals.

In the fast-paced environment of shallow-water acoustic surveillance, multiple frequency and bearing traces, each potentially changing with time, make the operator's relational task complex and difficult. Since the operator performs the significant portion of the relational computations involved in interpreting a conventional display, constant vigilance and quick action are necessary with conventional shallow water acoustic surveillance applications.

To avoid the shortcomings of the above-discussed techniques and for other reasons presented in the Description of the Preferred Embodiments, a need exists for an acoustic surveillance system which displays target data in a more efficient manner so that an operator can instantly distinguish and correlate between the signatures for targets at different bearings.

SUMMARY OF THE INVENTION

The present invention provides an acoustic surveillance system and method including a user interface for graphically displaying acoustic information produced by acoustic surveillance system sensors. The acoustic surveillance system user interface includes a processor and an acoustic data display. The processor receives the acoustic information from the acoustic surveillance system sensors and provides graphical display information representative of the acoustic information. The acoustic data display is coupled to the processor for receiving the graphical display information and includes a frequency history display area having a frequency axis and a time axis, a bearing history display area having a bearing axis and a time axis, and a frequency/bearing display area having a frequency axis and a bearing axis.

In one embodiment, the frequency axis of the frequency/bearing display area is the same as the frequency axis of the frequency history display area and the bearing axis of the frequency/bearing display area is the same as the bearing axis of the bearing history display area.

In a preferred embodiment, the frequency history area of the display is located above the frequency/bearing display area and the bearing history display area is located to the left of the frequency/bearing display area of a single s degrees to 360 degrees are provided on the display. In one embodiment, the display identifies the acoustic surveillance system sensor displayed.

In one embodiment of the invention, DIFAR sensors receive underwater sound pressure waves and provide electrical sound data signals which are transmitted to the processor.

In one embodiment, a marker located within the frequency/bearing display area identifies the computed bearing associated with an identified frequency. Relative directional uncertainty of the computed bearing is indicated by the width of the marker. In an alternate embodiment, uncertainty is indicated by marker size.

The present invention provides, in a single display, a frequency/bearing display area to efficiently show the correlation between the frequency/time history and bearing/time history information to the operator in an easy-to-interpret manner. The three display areas of the display are arranged and orientated so that the operator can instantly distinguish between the signatures for targets at different bearings. In addition, the historical bearing and signature information allows an operator to quickly recognize new targets.

BRIEF DESCRIPTION OF THE DRAWINGS

The features and advantages of the present invention will be better understood and appreciated from a consideration of the following detailed description when taken in conjunction with the accompanying drawings in the several figures in which like parts and/or elements bear like references numerals and in which.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 3:
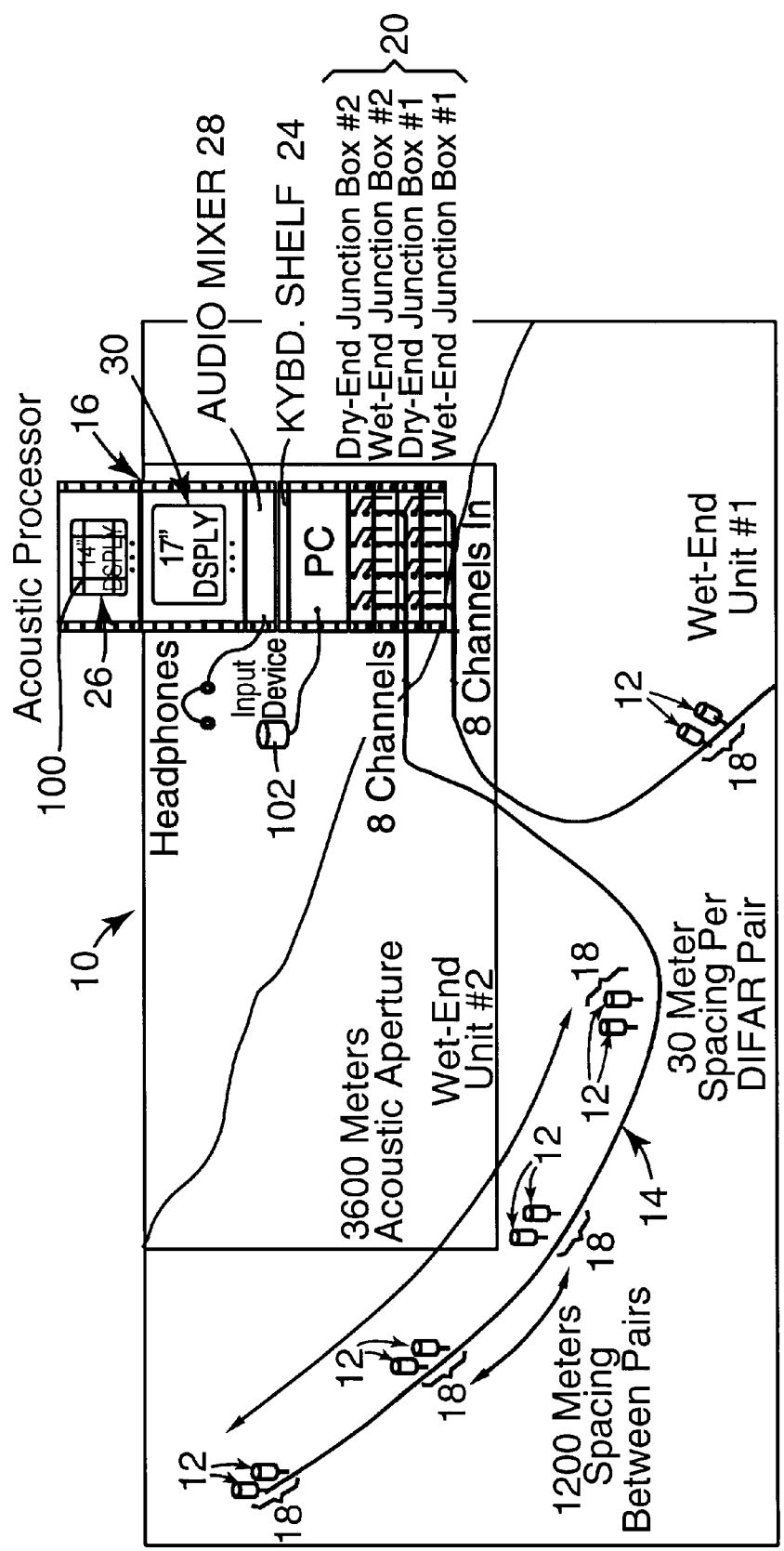
FIG. 3 pictorially illustrates an acoustic surveillance system deployed within an underwater environment.

FIG. 3 generally illustrates an acoustic surveillance system 10 deployed in a body of water in accordance with the present invention. Acoustic surveillance system 10 includes numerous sonar buoys 12 grouped in groups of at least two sonar buoys and displayed as listening devices by way of various known methods. Sonar buoys 12 sense pressure wave characteristics of sound signal sources and transmit sensor sound data signals representative of the sensed pressure wave characteristics via a cable 14 to an acoustic processor 16. Alternatively, sensor sound data signals are transmitted to acoustic processor 16 via an antenna and radio frequency or by other conventional transmission apparatus and methods.

In one embodiment of the present invention, sonar buoys 12 comprise bottom-moored and tethered directional frequency analysis and ranging (DIFAR) sensors. U.S. Provisional Patent Application Serial No. 60/141,752 filed on Jun. 30, 1999, which is assigned to the assignee of the present application, and which is herein incorporated by reference, details the construction and operation of bottom-moored and tethered sensors for sensing amplitude and direction of pressure waves.

In the DIFAR embodiment, each DIFAR sensor 12 sound data signal is derived from multiple hydrophone sensors with orthogonally-oriented axes, including an X-gradient hydrophone pair for sensing sounds along an X-axis (i.e., the cosine hydrophone data), a Y-gradient hydrophone pair for sensing sounds along a Y-axis (i.e., the sine hydrophone data), and an omni-directional hydrophone (i.e., omni-directional hydrophone data). Two adjacent DIFAR sensors 12, deployed approximately thirty meters apart, together define a node 18. In one embodiment, acoustic surveillance system 10 comprises eight nodes 18, or a total of sixteen DIFAR sensors 12. Therefore, sixteen composite output sound signals are transmitted from underwater locations. Optionally, acoustic surveillance system 10 comprises more or fewer DIFAR sensors 12.

DIFAR sensor 12 sound data signals are received by acoustic processor 16 which comprises of a plurality of junction boxes 20, a processor 24, and at least one acoustic data display 26. Junction boxes 20 are coupled between cable 14 and processor 24, which in turn is coupled to acoustic data display 26. Processor 24 receives acoustic information from DIFAR sensor 12 (i.e. sound data signals) and provides to acoustic data display 26 graphical display information representative of the acoustic information.

In the case where sensor sound data signals are transmitted to acoustic processor 16 via an antenna and radio frequency, acoustic processor 16 includes a radio frequency receiver and junction boxes 20 are coupled to the radio frequency receiver rather than cable 14. Additional system features are optionally included in acoustic processor 16, such as an audio mixer unit 28, an input device 102 and one or more additional displays 30. DIFAR sensor 12 sound data signals are received by the plurality of junction boxes 20 and routed to processor 24 for both narrowband (NB) and broadband (BB) processing.

Figure 4:
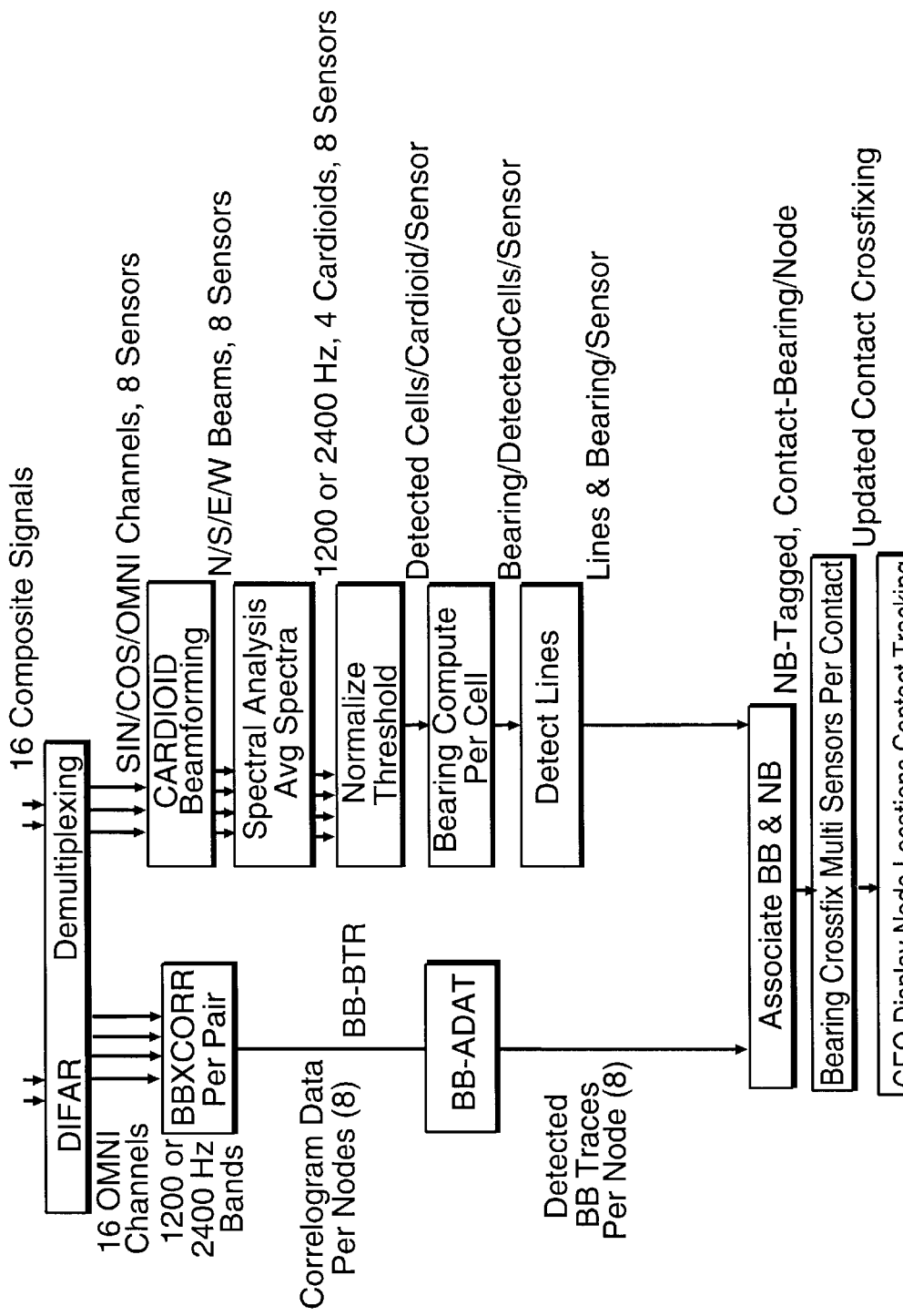
FIG. 4 is a partial block diagram illustrating one embodiment of a method for processing acoustic surveillance system signals.

FIG. 4 illustrates one embodiment of a method for processing the sensor sound data signals provided by DIFAR sensors 12. The use of both BB and NB bearings aid in determining a target's direction unambiguously. The analog DIFAR sensor sound data signals are converted to digital data. Next, a DIFAR demultiplexing function separates the sine (SIN), cosine (COS), and omni-directional (OMNI) channels per DIFAR sensor sound data signal. The SIN/COS/OMNI data is routed to the broadband (BB) and narrowband (NB) processing strings.

A BB processing path is illustrated on the left portion of FIG. 4. The OMNI channels are used for a broadband cross-correlation (BBXCORR) function between the OMNI channels of two closely-spaced DIFAR sensors 12 of node 18. BBXCOR bearings are relative to the axis of the two DIFAR sensors 12, and the orientation of the axis of the DIFAR sensors 12 is further determined with reference to true north. The output data are eight correlograms, one per node 18. Each BBXCORR Correlogram output is a difference-in-time-of-arrival for pressure wave signals arriving at the two OMNI hydrophones in node 18, versus time. The output is expressed as bearings relative to the axes of the two OMNI phones. Thus a detected BB target can be plotted/displayed in bearing versus time, or BB-BTR format.

An auto detect/tracker algorithm (BB-ADAT) is applied to the BB-BTR data to automatically derive bearings per target detected. In passive processing, BBXCORR provides a unique capability for directly displaying individual targets. This display of multiple targets, with associated bearing histories, greatly assists the operator in understanding the total area being surveyed. The BBXCORR display provides continuous, but ambiguous, bearing traces per target, allowing for uninterrupted holding of targets for operator analysis.

A NB processing path is illustrated on the right portion of FIG. 4. NB processing is matched to the characteristics of a target. A shallow-draft surface target, moving at high speed, does not maintain coupling with the water, thus signal sources such as bladelines are highly unstable. NB processing resolutions are matched to these signals that are several Hertz in bandwidth. Since DIFAR sensors 12 within node 18 are closely spaced (thirty meters), only one DIFAR sensor 12 per node 18 need be processed.

The SIN/COS/OMNI data for DIFAR sensor 12 is used as input to a cardioid beam-forming function to generate four orthogonal cardioid beams per DIFAR sensor 12, oriented as N/S/E/W beams. Individual DIFAR sensors contain compasses, so DIFAR sensor 12 NB bearings are corrected to true north. Auto detection in the cardioids take advantage of a 4.77 dB gain in the directional channels. This concept provides not only superior detection ranges, as compared to visual detection using omni-channels, but improved bearing estimates. In one processing method embodiment, spectral analysis is performed on each of the four cardioid beams. The spectral data is generated at a 0.625 second rate. Spectral analysis is performed employing either 2400 Hz (full-band), or 1200 Hz (half-band). Fast Fourier Transform (FFT) cell spacings are 6.4 HZ or 3.2 Hz respectively. These cell spacings are selected to match the signal bandwidth of small, shallow-draft surface crafts. Full-band works best to detect outboards, while half-band works best to detect diesel-powered boats. The spectral output is integrated, normalized, and thresholded at the 0.625 second rate for each cardioid. Using the detected (those exceeding threshold) FFT cell amplitudes for the N/S/E/W cardioids in an arctan computation, unambiguous bearings are computed per signal. These NB bearings are relative to magnetic north, as sensed by a flux-gate compass in each DIFAR sensor. The NB bearings are subsequently corrected to true north. Considering adjacency of detected frequency cells and the bearings of these adjacent cells, multiple cells can be merged to form NB target source lines with each line having a center frequency, bandwidth, and bearing. Single cell-width lines are possible. Detected lines are formed from the detected cell data, based on cells being adjacent in frequency and nearly equal in bearing. Finally, bearing and signature data are output from processor 24 to acoustic data display 26 for observation by system operators.

Figure 5:
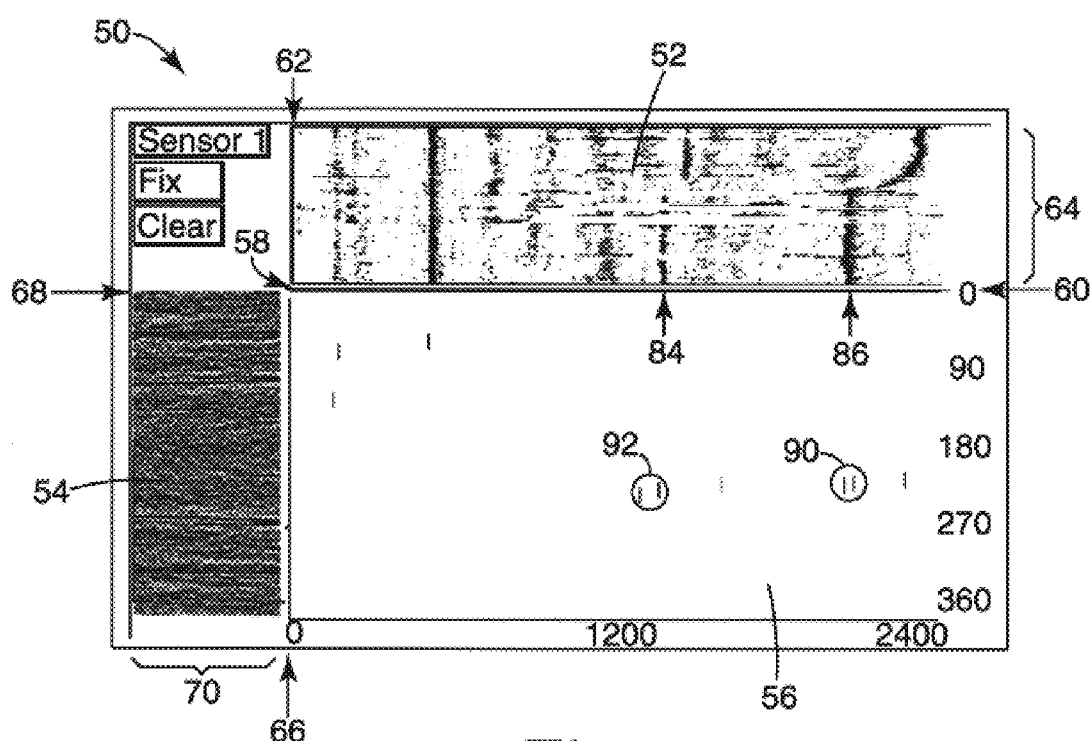
FIG. 5 is a pictorial representation of a composite acoustic data display of the present invention.

FIG. 5 illustrates a preferred embodiment of a bearing and signature data display for an acoustic surveillance system of the present invention, indicated generally at 50. Acoustic data display 50 comprises a frequency/time history display area 52, a bearing/time history display area 54, and a frequency/bearing display area 56. Frequency/bearing display area 56 of display 50 shows the correlation between the frequency/time history and bearing/time history information to the operator in an easy-to-interpret manner. The three display areas of display 50 are arranged and orientated so that the operator can instantly distinguish between the signatures for targets at different bearings. Including historical bearing and signature information makes it easier for an operator to recognize new targets.

Frequency/time history display area 52 of FIG. 5 graphically provides indication of the frequencies comprising the sound pressure waves. Frequency is plotted versus time as a LOFARgram. Either a composite from four cardioids or one of the N/S/E/W cardioids is displayed in frequency/time history display area 52. An origin 58 is indicated at the intersection of a horizontal X-axis 60 and a vertical Y-axis 62 of the LOFARgram. Frequency is plotted along X-axis 60 (frequency axis). Time is plotted along Y-axis 62 (time axis). In the embodiment illustrated in FIG. 5, frequency increases from origin 58 extending to the right along X-axis 60; time increases from origin 58 extending vertically upward. The most recent frequency/time data is indicated adjacent to horizontal axis 60. A time period 64 of historical frequency data which is displayed is variable according to the needs of the operator and the characteristics of acoustic surveillance system 10.

Figure 1:
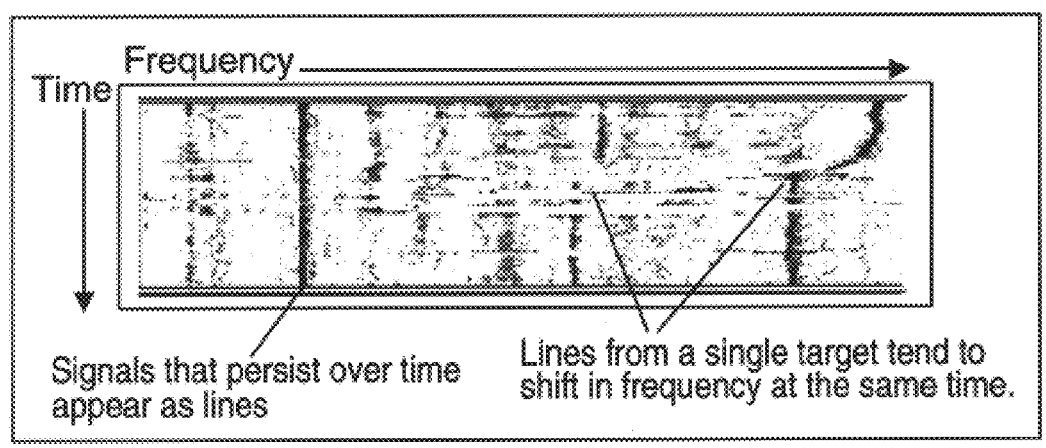
FIG. 1 is a pictorial representation of a conventional frequency history acoustic data display.
Figure 2:
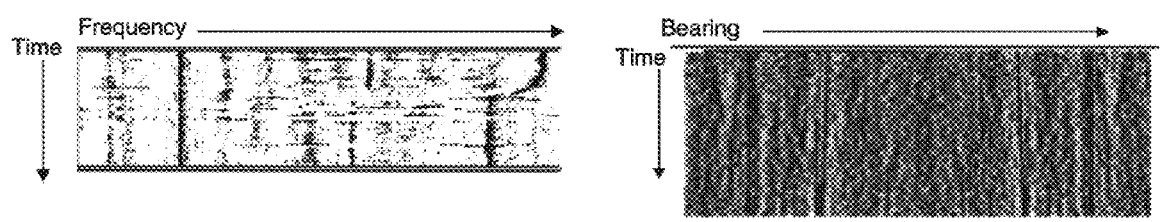
FIG. 2 is a pictorial representation of a conventional acoustic data display providing frequency history and bearing history.

Referring to FIG. 5, bearing/time history display area 54 graphically provides indication of bearing characteristics of the sound pressure waves. Bearing is plotted versus time as a Correlogram, with the intersection of a Correlogram horizontal X-axis 68 and a Correlogram vertical Y-axis 66 located at origin 58. Time is plotted along X-axis 68 (time axis). Bearing is plotted along Y-axis 66 (bearing axis). In the embodiment illustrated in FIG. 5, time increases from origin 58 extending to the left along X-axis 68; bearing increases from zero degrees at origin 58 extending vertically downward to 360 degrees. The most recent bearing/time data is indicated adjacent to vertical axis 66. The orientation of the axes of bearing/time history Correlogram of the present invention (bearing/time history area 54 of FIG. 5) is unique over conventional displays of bearing versus time information (FIG. 2). A time period 70 of historical bearing data displayed is variable according to the needs of the operator and the characteristics of acoustic surveillance system 10.

Frequency/bearing display area 56 graphically correlates the most-recent frequency and bearing characteristics of the sound pressure waves. Frequency is plotted versus bearing. Horizontal X-axis 60 of frequency/bearing display area 56 is the same horizontal X-axis of frequency/time history display area 52. The frequency scales for frequency/time history area 52 and bearing/frequency area 56 are aligned. Vertical Y-axis 66 of frequency/bearing display area 56 is the same vertical Y-axis of bearing/time history display area 54. The bearing scales for bearing/time history area 54 and frequency/bearing area 56 are aligned, and are both corrected for true north. The intersection of horizontal X-axis 60 and vertical Y-axis 66 is located at origin 58. Frequency is plotted along X-axis 60 (frequency axis). Bearing is plotted along Y-axis 66 (bearing axis). In the embodiment illustrated in FIG. 5, frequency increases from origin 58 extending to the right along X-axis 60; bearing increases from zero degrees at origin 58 extending vertically downward to 360 degrees.

Frequency/bearing display area 56 provides the association of BB and NB data per target illustrated according to the present invention. This association is facilitated with the composite bearing/frequency display shown in FIG. 5. Display 50 combines frequency/time history display area 52, bearing/time history display area 54 and frequency/bearing display area 56 into a single display.

While the preferred embodiment described above provides a specific absolute orientation, alternate embodiments and orientations are included in the present invention. Alternate embodiments include display 50, as illustrated in FIG. 5, rotated about origin 58 90-degrees clockwise, 180-degrees clockwise and 270-degrees clockwise. In another alternate embodiment, the position of frequency/time history display area 52 illustrated in FIG. 5 is interchanged with the position of bearing/time history area 54 such that the frequency is plotted in frequency/bearing display area 56 along Y-axis 66 extending vertically downward from origin 58. The present invention includes subsequent rotation of display 50 about origin 58 after the above-mentioned interchange.

A feature of the preferred mode of the present invention is that the frequency axis of frequency/time history display area 52 is coincident with the frequency axis of frequency/bearing display area 56 and the bearing axis of bearing/time history display area 54 is coincident with the bearing axis of bearing/time history area 54. In alternative embodiments of the present invention, frequency/time history display area 52, bearing/time history display area 54 and frequency/bearing display area 56 are oriented with respect to each other as described above, but physically segregated from each other such that frequency and bearing axes are non-coincident. It will be understood by those with ordinary skill in the art that acoustic display area 50 of the present invention includes configurations where the above-mentioned display areas are physically separated, but oriented relative to each other as described above.

Figure 6:
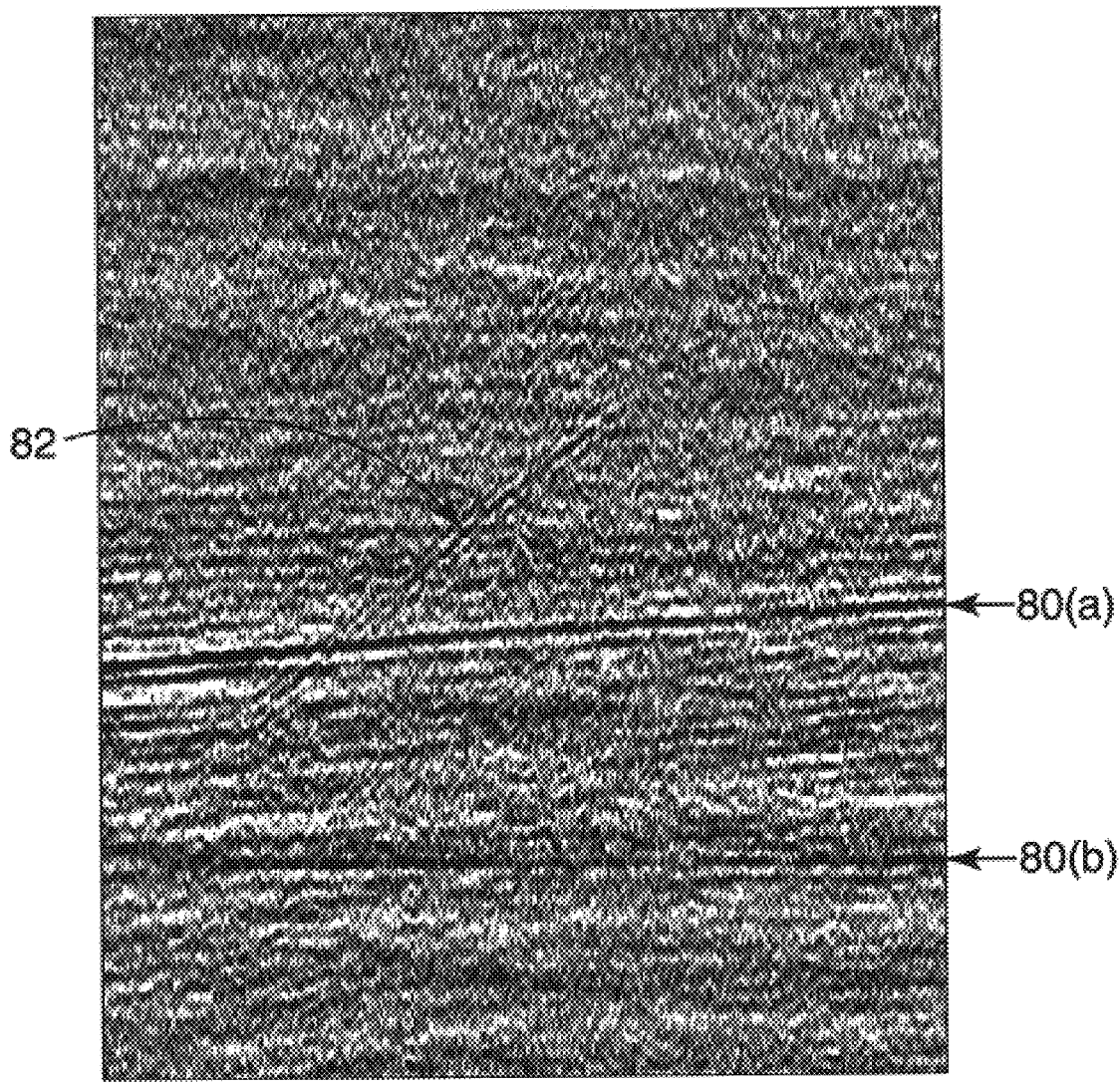
FIG. 6 is a pictorial representation of a Correlogram.

FIG. 6 is an expanded view of bearing/time history display area 54 of FIG. 5 (identical orientation but axes not shown) to more clearly illustrate the unique benefit from BBXCORR processing and demonstrate the advantage of combining two DIFAR sensors 12 to form node 18. At a glance of the Correlogram, the operator can easily recognize the presence of distinct, multiple targets. Bearing/time history display area 54 is a great aid to the operator in understanding the surface picture. FIG. 6 illustrates two relatively strong targets, indicated by two continuous/dark/near-horizontal lines (plus multi-path) at 80(*a*) and 80(*b*). A diagonal line 82 indicates another target, probably smaller and faster.

Targets are detected in frequency/time history area 52 manually by observing dark, near-vertical lines on the LOFARgram display, such as those indicated at 84 and 86. Each line represents a signal source from a target, cyclically repeating at a particular rate per second (Hz). Multiple lines from multiple targets are displayed when simultaneously detected by DIFAR sensor 12.

The LOFARgram displayed in frequency/time history display area 52 of FIG. 5, unlike the Correlogram displayed in bearing/time history display area 54 of FIG. 5, does not always present individual targets for easy operator recognition. Rather, the operator must attempt to group lines based on some consistency. One such method for relating signals is to recognize several lines simultaneously increasing in frequency, as would take place during an event such as an increase in speed. From frequency/time history display area 52 of FIG. 5, the lines at approximately 1400 Hz, indicated at 84, and 2100 Hz, indicated at 86, are shifting in frequency simultaneously. The LOFARgram alone is a good basic display for manual/operator NB analysis, but it lacks unambiguous bearing information.

Figure 7:
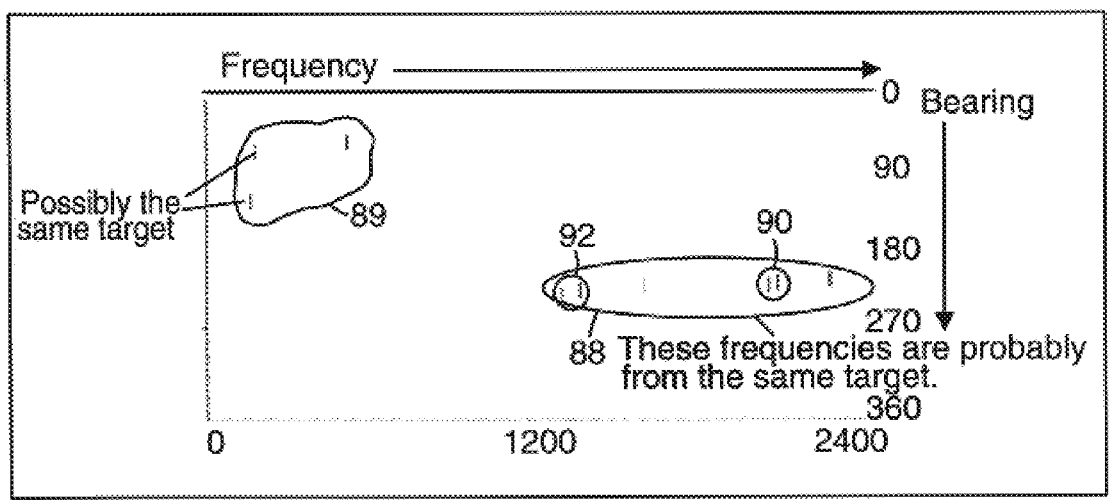
FIG. 7 is a pictorial representation of the frequency/bearing area of the acoustic data display.

Frequency/bearing display area 56, illustrated in FIG. 5 is further illustrated in FIG. 7. FIG. 7 illustrates two frequency set groupings of markers within frequency/bearing display area 56. A frequency/bearing grouping is shown above 1200 Hz, indicated at 88, and a second frequency/bearing grouping below 600 Hz, indicated at 89. These frequency/bearing groupings correspond to the predominant lines on frequency/time history display area 52 (LOFARgram), located directly above frequency/bearing area 56 in the preferred embodiment. Bearing/time history area 54 shows two strong bearing traces (horizontal lines) at 80(*a*) and 80(*b*) in FIG. 6. One represents a true bearing the other the ambiguous bearing. Lower BB bearing trace 80(*b*) lines-up with the lower frequency/bearing marker group 88 in frequency/bearing area 56, thus identifying the true BB bearing.

In a similar manner, upper NB frequency/bearing grouping 89 shown in frequency/bearing display area 56 relates to lower (rather weak) BB bearing trace 80(*b*), again identifying the true BB bearing. When such consistencies in BB and NB occur, a target is very definitely recognized and its BB bearing is determined. In a multi-target environment, the problem then becomes one of recognizing the same target on other nodes.

Vertical, ganged cursors, indicated at 100 in FIG. 3, are placed over the predominant LOFARgram lines/frequencies in frequency/time history display area 52 for the target. Cursors 100 are manipulated by an operator using an input device, indicated at 102 in FIG. 3, to provide control information to processor 24. Input device 102 is preferably a trackball. Alternatively, input device 102 may be a keyboard, touchscreen, mouse or other conventional man/machine interface mechanism. The cursors allow for a rapid search of other nodes' BB/NB displays, seeking the same frequencies and same target generated NB signature. When a match occurs, bearings are derived at the second node. In one embodiment of the present invention, composite BB/NB displays are generated, one per node, continuously and simultaneously. Input device 102 is also used to control display information. Control means and information are provided in the upper-left hand area of acoustic data display 50, as shown in FIG. 5.

Frequency/bearing display area 56 is updated for automatically detected NB signals, at selected integration rates. Frequency/bearing display area 56 shows the same predominant frequencies as observed on the corresponding LOFARgram in frequency/time history area 52 of FIG. 5. A bearing associated with each frequency line in frequency/time history area 52 is computed and displayed within frequency/bearing display area 56 as a marker at the intersection of the frequency line and the computed bearing.

For example, in FIG. 5, a marker 90 indicates the intersection of 2100 Hz frequency line 86 and its associated computed bearing. Similarly, marker 92 indicates the intersection of 1400 Hz frequency line 84 and its associated computed bearing. As indicated in FIG. 7, markers 90 and 92 are probably from the same target (since the bearings computed from the signals at each frequency are the same). This result is not obvious from a conventional display of frequency/time history and bearing/time history plotted such that the common axis is time (see FIG. 2). Markers 90 and 92 indicate relative directional uncertainty which varies by the size, either length or width, of markers 90 and 92. Alternatively, size of markers is used to indicate relative uncertainty in the bearing computation.

Thus, frequency lines (signals) 84 and 86, generated from the same target, will appear at nearly the same bearing on frequency/bearing display area 56. From FIG. 7, three separate bearing groupings of frequencies can readily be observed, indicating the presence of three separate targets. While the lines indicating a target in frequency/time history display area 52 and bearing/time history area 54 lines are continuous, frequency/bearing area 56 target markers (e.g., 90 and 92) can fluctuate since they reflect only the most recently-available data. BB bearings are ambiguous, while NB bearings are unambiguous, thus the NB bearings can be used to eliminate the BB bearing ambiguity.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An acoustic surveillance system comprising:
   at least one group of sonar buoys for sensing pressure waves characteristics of sound signal sources in an underwater environment, providing sound data signals representative of the sensed pressure wave characteristics and transmitting the sound data signals;
   a processor for receiving the sound data signals and determining bearing and frequency characteristics of the sound data signals; and
   an acoustic data display coupled to the processor for displaying the bearing and frequency characteristics of the sound data signals, the acoustic data display including:
      a frequency history display area having a first frequency axis and a first time axis;
      a bearing history display area having a first bearing axis and a second time axis substantially perpendicular to the first time axis; and
      a frequency/bearing display area displaying frequency along the first frequency axis versus bearing along the first bearing axis.

2. The acoustic surveillance system of claim 1 wherein the at least one group of sonar buoys are bottom-moored and tethered directional frequency analysis and ranging (DIFAR) sensors.

3. The acoustic surveillance system of claim 1 wherein:
   the first bearing axis is oriented vertically and the first frequency axis is oriented horizontally;
   the bearing history display area is located adjacent to the frequency/bearing display area;
   the second time axis extends in increasing time in a direction orthogonally away from the frequency/bearing display area;
   the frequency history area is located adjacent to the frequency/bearing area; and
   the first time axis extends in increasing time in a direction orthogonally away from the frequency/bearing display area.

4. The acoustic surveillance system of claim 1 further comprising:
   a bearing scale oriented substantially parallel to the first bearing axis; and
   a frequency scale oriented substantially parallel to the first frequency axis.

5. The acoustic surveillance system of claim 1 wherein:
   the bearing history display area identifies and illustrates direction from which sound pressure waves are received by the acoustic surveillance system sensors;
   the frequency history display area identifies and illustrates frequencies comprising the sound pressure waves received by the acoustic surveillance system sensors; and
   the frequency/bearing display area identifies and illustrates a direction for frequencies identified and illustrated within the frequency history display area.

6. The acoustic surveillance system of claim 5 wherein the direction for each frequency identified and illustrated within the frequency history display area is shown by a marker located within the frequency/bearing display area at the intersection of each frequency identified and illustrated within the frequency history display area and a direction.

7. The acoustic surveillance system of claim 1 wherein:
   the bearing history display area illustrates a history of bearing information, versus time, of sound pressure waves received by the acoustic surveillance system sensors; and
   the frequency history display area illustrates a history of frequency information, versus time, comprising the sound pressure waves received by the acoustic surveillance system sensors.

8. The acoustic surveillance system of claim 7 wherein:
   the most recent bearing information is located within the bearing history display area nearest to the frequency/bearing display area; and
   the most recent frequency information is located within the frequency history display area nearest to the frequency/bearing display area.

9. An acoustic surveillance system user interface for graphically displaying acoustic information produced by acoustic surveillance system sensors, the acoustic surveillance system user interface comprising:
   a processor for receiving the acoustic information from the acoustic surveillance system sensors and providing graphical display information representative of the acoustic information; and
   an acoustic data display coupled to the processor for receiving the graphical display information and including:
      a frequency history display area having a first frequency axis and a first time axis;
      a bearing history display area having a first bearing axis and a second time axis substantially perpendicular to the first time axis; and
      a frequency/bearing display area displaying frequency along the first frequency axis versus bearing along the first bearing axis.

10. The acoustic surveillance system user interface of claim 9 wherein:
    the first bearing axis is oriented vertically and the first frequency axis is oriented horizontally;
    the bearing history display area is located adjacent to the frequency/bearing display area;
    the second time axis extends in increasing time in a direction orthogonally away from the frequency/bearing display area;
    the frequency history area is located adjacent to the frequency/bearing area; and
    the first time axis extends in increasing time in a direction orthogonally away from the frequency/bearing display area.

11. The acoustic surveillance system user interface of claim 9 further comprising:
    a bearing scale oriented substantially parallel to the first bearing axis; and
    a frequency scale oriented substantially parallel to the first frequency axis.

12. The acoustic surveillance system user interface of claim 11 wherein:
    the bearing scale ranges from approximately 0 to approximately 360 degrees and is located adjacent to the frequency/bearing display area; and
    the frequency scale ranges from approximately 0 to approximately 2400 Hertz and is located adjacent to the frequency/bearing display area.

13. The acoustic surveillance system user interface of claim 9 further comprising:

an identification of the acoustic surveillance system sensors producing the displayed data.

14. The acoustic surveillance system user interface of claim 9 wherein:

the bearing history display area identifies and illustrates direction from which sound pressure waves are received by the acoustic surveillance system sensors;

the frequency history display area identifies and illustrates frequencies comprising the sound pressure waves received by the acoustic surveillance system sensors; and the frequency/bearing display area identifies and illustrates a direction for frequencies identified and illustrated within the frequency history display area.

15. The acoustic surveillance system user interface of claim 14 wherein the direction for each frequency identified and illustrated within the frequency history display area is shown by a marker located within the frequency/bearing display area at the intersection of each frequency identified and illustrated within the frequency history display area and a direction.

16. The acoustic surveillance system user interface of claim 15 wherein a relative directional uncertainty for each marker shown within the frequency/bearing display area is indicated.

17. The acoustic surveillance system user interface of claim 16 wherein the relative directional uncertainty for each marker shown within the frequency/bearing display area is indicated by the size of the marker.

18. The acoustic surveillance system user interface of claim 16 wherein the relative directional uncertainty for each marker shown within the frequency/bearing display area is indicated by the size of the marker.

19. The acoustic surveillance system user interface of claim 9 wherein:

the bearing history display area illustrates a history of bearing information, versus time, of sound pressure waves received by the acoustic surveillance system sensors; and the frequency history display area illustrates a history of frequency information, versus time, comprising the sound pressure waves received by the acoustic surveillance system sensors.

20. The acoustic surveillance system user interface of claim 19 wherein:

the most recent bearing information is located within the bearing history display area nearest to the frequency/bearing display area; and the most recent frequency information is located within the frequency history display area nearest to the frequency/bearing display area.

21. An acoustic surveillance system user interface for graphically displaying sensor information produced by a plurality of acoustic surveillance system sensors, the acoustic surveillance system user interface comprising:

a display having a plurality of display areas for providing graphical information including a control display area, a frequency history display area having a first frequency axis and a first time axis, a bearing history display area having a first bearing axis and a second time axis substantially perpendicular to the first time axis, and a frequency/bearing display area displaying frequency along the first frequency axis versus bearing along the first bearing axis;

an input device for selecting at least one group of acoustic system sensors and providing control information related to the plurality of display areas; and a processor receiving the sensor information and responsive to the control information provided by the input device to control the display to graphically display in the plurality of display areas information from the at least one acoustic system sensor selected by the input device.

22. A method of acoustic surveillance, the method comprising:

sensing pressure waves characteristics of sound signal sources in an underwater environment;

providing sound data signals representative of the sensed pressure wave characteristics;

transmitting the sound data signals;

receiving the sound data signals and determining bearing and frequency characteristics of the sound data signals;

displaying frequency history representing the frequency characteristics of the sound data signals in a first display area having a first frequency axis and a first time axis;

displaying bearing history representing the bearing characteristics of the sound data signals in a second display area having a first bearing axis and a second time axis substantially perpendicular to the first time axis; and displaying frequency/bearing information representing the bearing and frequency characteristics in a third display area along the first frequency axis versus the first bearing axis.

23. A method of graphically displaying information representing underwater sound characteristics determined by an acoustic surveillance system, the method comprising:

displaying underwater sound frequency along a first frequency axis versus time along a first time axis in a first display area;

displaying underwater sound bearing along a first bearing axis versus time along a second time axis substantially perpendicular to the first time axis in a second display area; and displaying underwater sound frequency along the first frequency axis versus bearing along the first bearing axis in a third display area.

24. The method of claim 23 further comprising:

providing display information and control in a fourth display area.

25. The method of claim 23 wherein frequency versus time is displayed as a LOFARgram.

26. The method of claim 23 wherein bearing versus time is displayed as a Correlogram.

* * * * *